UNITED STATES PATENT OFFICE

2,252,843

MONO-AZO DYESTUFFS INSOLUBLE IN WATER

Ernst Fischer, Offenbach-on-the-Main, Germany, assignor to General Aniline & Film Corporation, a corporation of Delaware No Drawing. Application June 6, 1939, Serial No. 277,623. In Germany June 7, 1938

5 Claims. (Cl. 260—204)

The present invention relates to mono-azo-dyestuffs insoluble in water; more particularly it relates to dyestuffs of the following general formula:

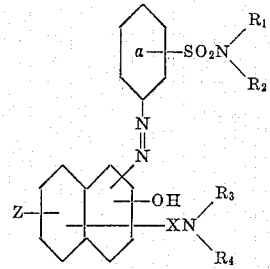

wherein the benzene radical $a$ may contain alkyl-, alkoxy-, aralkoxy-, aryloxy-groups or halogen atoms as substituents, X stands for the group —CO— or —SO₂—, $R_1$, $R_2$, $R_3$ and $R_4$ are alkyl-, aralkyl-, aryl- or hydroaromatic radicals which may be connected to form a heterocyclic ring system, and Z stands for hydrogen, alkoxy or halogen.

I have found that valuable pigment dyestuffs are obtained by coupling the diazo-compounds from amines of the general formula:

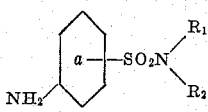

wherein the benzene radical $a$ may contain alkyl-, alkoxy-, aralkoxy-, aryloxy-groups or halogen as substituents, with such derivatives of alpha- or beta-naphthol capable of forming an azo-dyestuff as contain as a substituent the group

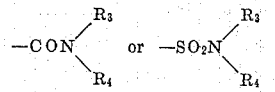

$R_1$ and $R_2$ as well as $R_3$ and $R_4$ being alkyl-, aralkyl-, aryl- or hydroaromatic radicals which may be connected in a heterocyclic ring system, only such dyestuff components being used as do not contain any group lending solubility in water, such as, for instance, sulfonic or carboxylic acid groups.

The new dyestuffs yield orange, red and brown tints of good properties of fastness. They are insoluble in water, but very easily soluble in organic solvents, such as hydrocarbons, alcohols, esters, ketones and can, therefore, be used for coloring these solvents as well as the lacquers prepared by means of these solvents—for instance nitro- or acetylcellulose lacquers—films or plastic masses. They are also very suitable for coloring varnishes, candles and fats.

In comparison with the dyestuffs described in U. S. Patents Nos. 1,995,933 and 2,058,222 which contain either the same diazo-components or the same coupling components and in comparison with the dyestuffs described in French Patents 749,926 and 786,389 the dyestuffs obtainable by the present invention are distinguished by their considerably better solubility in organic solvents so that they are especially suitable for coloring substances of the above kind.

The following examples serve to illustrate the invention but they are not intended to limit it thereto; the parts are by weight:

1. 15.9 parts of 1-amino-2-methyl-5-(N-(n)-butyl-phenyl-aminosulfonyl)-benzene are diazotized in the usual manner. In order to bind the excess of mineral acid, sodium acetate is added to the diazo-solution and the whole is then stirred into a solution of 13.9 parts of 2-hydroxy-3-(N-methyl-phenylaminocarbonyl)-naphthalene in dilute caustic soda solution. When the coupling is complete, the dyestuff formed is filtered with suction, washed well and dried. It is a yellow-red powder which dissolves easily in ethyl alcohol, ethyl acetate, acetone and other organic solvents to a yellow-red solution and colors cellulose ester lacquers vivid and fast tints. The dyestuff corresponds with the following formula:

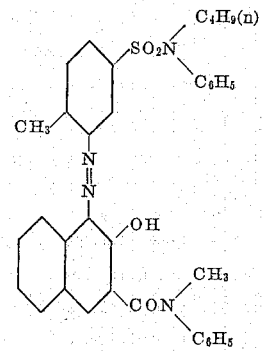

2. 17.2 parts of 1-amino-2.5-dimethoxy-4-(di-(n) butylamino-sulfonyl)-benzene are diazotized in the usual manner. The diazo-solution is made neutral to Congo paper by means of sodium acetate and then stirred into a solution of 12.8 parts of 2-hydroxy-3-(N-piperidino-carbonyl)-naphthalene in dilute caustic soda solution. The dyestuff formed is filtered with suction, washed well and dried. It dissolves easily in acetone, butyl acetate, xylene and other organic solvents and colors nitro- and acetylcellulose lacquers as well as varnishes vivid red tints which are much more bluish than those obtainable with the dyestuff of Example 1.

3. From the diazo-compound of 14.2 parts of 1-amino-2-(di(n)butylaminosulfonyl)-benzene and 12.1 parts of 2-hydroxy-3-(diethylaminocarbonyl)-naphthalene there is obtained, in the manner described in Examples 1 and 2, an orange dyestuff which dissolves easily in organic solvents and colors plastic masses and lacquers prepared by means of these solvents, as well as candles and fats, orange tints of good fastness to light.

4. A pigment dyestuff is prepared in the manner described in Examples 1 and 2 from the diazo-compound of 15.7 parts of 1-amino-2-methoxy-5-(di(n)butylaminosulfonyl)-benzene and 14.0 parts of 1-hydroxy-3-(diethylaminosulfonyl)-naphthalene. It is a red powder which colors the various organic solvents and the lacquers prepared by means of these solvents, as well as candles and fats, vivid and fast tints.

5. A pigment dyestuff is prepared in the manner described in Examples 1 and 2 from the diazo-compound of 13.8 parts of 1-amino-4-(N-methyl-benzylaminosulfonyl)-benzene and 12.1 parts of 1-hydroxy-2-(diethylaminocarbonyl)-naphthalene. It dissolves easily in butyl acetate and xylene and colors varnishes as well as nitro- and acetyl-cellulose lacquers brownish-red tints of good fastness to light.

The following table illustrates a number of other mono-azo-dyestuffs obtainable by the present invention which are likewise easily soluble in solvents usually applied for the foregoing purposes and have good properties of fastness:

preciate the fastness of the dyestuffs to alkalies. Substituents of this kind are, for instance, the sulfonic acid and the carboxylic acid group.

I claim:

1. The water-insoluble mono-azo-dyestuffs of the following general formula:

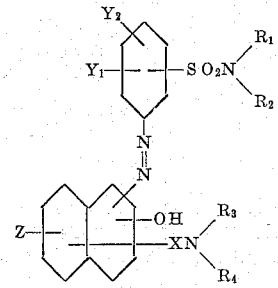

wherein X stands for one of the groups —CO— and —$SO_2$—, Y stands for a member of the group consisting of hydrogen, alkyl, alkoxy, benzyloxy, phenoxy and halogen, $Y_2$ for a member of the group consisting of hydrogen, alkyl and alkoxy, Z for a member of the group consisting of hydro-

| | Diazo-compound from— | Coupled with— | Shade |
|---|---|---|---|
| 1 | 1-amino-2-methoxy-5-(di-(n)butylaminosulfonyl)-benzene | 2-hydroxy-3-(N-piperidino-carbonyl)-naphthalene | Yellowish-red. |
| 2 | ....do.... | 2-hydroxy-3-(N-(n)-butyl-phenylaminocarbonyl)-naphthalene. | Do. |
| 3 | ....do.... | 2-hydroxy-3-(N-phenyl-2'-naphthylamino-carbonyl)-naphthalene. | Do. |
| 4 | ....do.... | 2-hydroxy-3-(N-phenylcyclohexylaminocarbonyl)-naphthalene. | Do. |
| 5 | ....do.... | 2-hydroxy-3-(dibenzylaminocarbonyl)-naphthalene | Do. |
| 6 | 1-amino-2-methoxy-5-(di-(n)butylaminosulfonyl)-benezene. | 2-hydroxy-3-(N-[4'-methoxy]-benzyl-cyclohexyl-amino-carbonyl)-naphthalene. | Do. |
| 7 | 1-amino-2-methoxy-4-(dimethylaminosulfonyl)-benzene | 2-hydroxy-3-(N-(n)-butylphenylaminocarbonyl)-naphthalene. | Do. |
| 8 | 1-amino-2-methoxy-5-(diethylaminosulfonyl)-benzene | 2-hydroxy-3-(N-piperidino-carbonyl)-naphthalene | Do. |
| 9 | 1-amino-2,5-dimethoxy-4-(di(n)butylaminosulfonyl)-benzene. | 2-hydroxy-3-(diphenylaminocarbonyl)-naphthalene | Bluish-red. |
| 10 | ....do.... | 2-hydroxy-3-(N-cyclohexylphenylaminocarbonyl)-naphthalene. | Bordeaux. |
| 11 | 1-amino-2,4-dimethoxy-5-(di(n)butylaminosulfonyl)-benzene. | 2-hydroxy-3-(N-methylbenzylaminocarbonyl)-naphthalene. | Red. |
| 12 | 1-amino-4-ethoxy-5-(N-ethyl-cyclohexylaminosulfonyl)-benzene. | 2-hydroxy-3-(N-carbazole-carbonyl)-naphthalene | Do. |
| 13 | 1-amino-4-ethoxy-5-(di(n)butylaminosulfonyl)-benzene | 2-hydroxy-3-(N-benzyl-phenylamino-carbonyl)-naphthalene. | Yellowish-red. |
| 14 | 1-amino-2-ethoxy-5-(di-isobutylaminosulfonyl)-benzene | 2-hydroxy-3-(dicyclohexylaminocarbonyl)-naphthalene | Red. |
| 15 | 1-amino-2-methyl-5-(N-benzyl-cyclohexylaminosulfonyl)-benzene. | 2-hydroxy-3-(dimethylaminocarbonyl)-naphthalene | Orange. |
| 16 | 1-amino-4-methyl-5-(N-piperidinosulfonyl)-benzene | 2-hydroxy-3-(N-piperidinocarbonyl)-naphthalene | Do. |
| 17 | 1-amino-2-methyl-5-(N-methyl-[2'-methyl]-phenylamino-sulfonyl)-benzene. | ....do.... | Do. |
| 18 | 1-amino-4-chloro-5-(N-piperidinosulfonyl)-benzene | 2-hydroxy-3-(N-ethylcyclohexylaminocarbonyl)-naphthalene. | Yellowish-red. |
| 19 | 1-amino-2-methoxy-5-methyl-4-(diethylaminosulfonyl)-benzene. | 2-hydroxy-6-(N-methylphenylaminocarbonyl)-naphthalene. | Red. |
| 20 | 1-amino-4-ethoxy-5-(di(n)butylaminosulfonyl)-benzene | 1-hydroxy-4-(diethylaminosulfonyl)-naphthalene | Yellowish-red. |
| 21 | 1-amino-2-methoxy-5-(di(n)butylaminosulfonyl)-benzene | ....do.... | Red. |
| 22 | 1-amino-2-methyl-5-(dibenzylaminosulfonyl)-benzene | 2-hydroxy-3-(N-methylphenylaminocarbonyl)-naphthalene. | Orange. |
| 23 | 1-amino-2-benzyloxy-5-(di(n)butylaminosulfonyl)-benzene | 2-hydroxy-3-(N-methylphenylaminocarbonyl)-naphthalene. | Yellowish-red. |
| 24 | 1-amino-2-phenoxy-5-(di(n)butylaminosulfonyl)-benzene | ....do.... | Do. |
| 25 | 1-amino-2-methoxy-5-(N-carbazole-sulfonyl)-benzene | ....do.... | Red. |
| 26 | 1-amino-2-methoxy-5-(dicyclohexylaminosulfonyl)-benzene | ....do.... | Do. |
| 27 | 1-amino-2-methoxy-5-(diphenylaminosulfonyl)-benzene | ....do.... | Do. |
| 28 | 1-amino-2-methoxy-5-(N-benzyl-phenylaminosulfonyl)-benzene. | ....do.... | Do. |
| 29 | 1-amino-2-methoxy-5-(N-ethyl-1'-naphthylaminosulfonyl)-benzene. | ....do.... | Do. |
| 30 | 1-amino-2,4-dimethyl-5-(di(n)butylaminosulfonyl)-benzene | ....do.... | Do. |
| 31 | 1-amino-2-methoxy-5-(N-methyl-benzylaminosulfonyl)-benzene. | 2-hydroxy-6-bromo-3-(N-methyl-phenylaminocarbonyl)-naphthalene. | Do. |
| 32 | 1-amino-2,5-dimethoxy-4-(di(n)butylaminosulfonyl)-benzene. | 2-hydroxy-6-bromo-3-(N-methyl-benzylamino-carbonyl)-naphthalene. | Bordeaux. |
| 33 | ....do.... | 2-hydroxy-6-methoxy-3-(diethylaminocarbonyl)-naphthalene. | Red-violet. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to degen, alkoxy and halogen; $R_1$, $R_2$, $R_3$ and $R_4$ stand for members of the group consisting of alkyl, benzyl, radicals of the benzene and naphthalene series and hydroaromatic radicals, which may be connected to form a heterocyclic ring system, being insoluble in water, but very easily soluble in organic solvents and yielding orange, red and brown shades of good properties of fastness.

2. The water-insoluble mono-azo-dyestuffs of the following general formula:

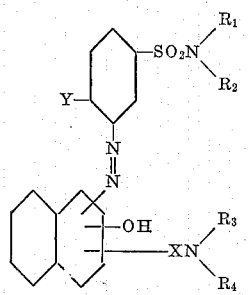

wherein X stands for one of the groups —CO— and —SO₂—, Y stands for a member of the group consisting of hydrogen, alkyl, alkoxy, benzyloxy, phenoxy and halogen; $R_1$, $R_2$, $R_3$ and $R_4$ stand for members of the group consisting of alkyl, benzyl, radicals of the benzene and naphthalene series and hydroaromatic radicals, which may be connected to form a heterocyclic ring system, being insoluble in water, but very easily soluble in organic solvents and yielding orange, red and brown shades of good properties of fastness.

3. The water-insoluble mono-azo-dyestuff of the following formula:

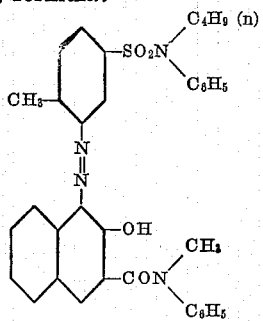

being a yellow-red powder which dissolves easily in organic solvents, such as acetone, ethyl alcohol, butyl acetate, ethyl acetate, butyl alcohol and xylene, and colors, for instance, cellulose ester lacquers yellow-red tints of good properties of fastness.

4. The water-insoluble mono-azo-dyestuff of the following formula:

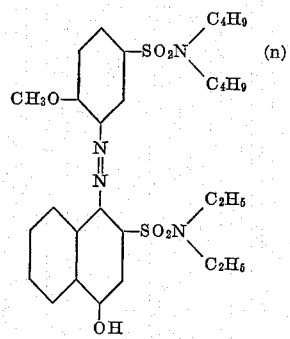

being a red powder which dissolves easily in organic solvents, such as acetone, ethyl alcohol, butyl acetate, ethyl acetate, butyl alcohol and xylene, and colors the various organic solvents and the lacquers prepared therewith, as well as candles and fats vivid red tints of good properties of fastness.

5. The water-insoluble mono-azo-dyestuff of the following formula:

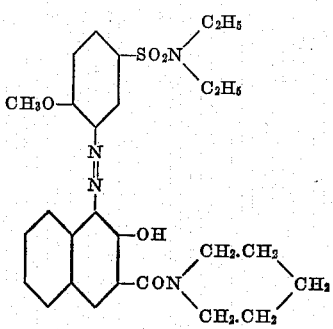

being a yellowish-red powder which dissolves easily in organic solvents, such as acetone, ethyl alcohol, butyl acetate, ethyl acetate, butyl alcohol and xylene, and colors, for instance, cellulose ester lacquers yellowish-red tints of good properties of fastness.

ERNST FISCHER.